United States Patent [19]

Takahashi et al.

[11] Patent Number: 4,802,017
[45] Date of Patent: Jan. 31, 1989

[54] DEVICE FOR RECORDING IMAGE SIGNALS OF PHOTOGRAPHIC PICTURES

[75] Inventors: Isao Takahashi; Takahiro Ohta, both of Ashigarakami, Japan

[73] Assignee: Fuji Photo Film, Ltd., Kanagawa, Japan

[21] Appl. No.: 829,948

[22] Filed: Feb. 18, 1986

[30] Foreign Application Priority Data

Feb. 20, 1985 [JP] Japan .................................. 60-32290

[51] Int. Cl.$^4$ .............................................. H04N 5/76
[52] U.S. Cl. .................................. 358/335; 360/35.1; 360/33.1
[58] Field of Search .................... 360/35.1, 33.1, 14.1, 360/9.1, 72.2; 358/335, 906, 180, 287, 229

[56] References Cited

U.S. PATENT DOCUMENTS

| | | | |
|---|---|---|---|
| 3,824,336 | 7/1974 | Gould | 358/227 |
| 4,302,776 | 11/1981 | Taylor | 360/9.1 |
| 4,660,091 | 4/1987 | Nutting | 358/227 |

OTHER PUBLICATIONS

Research Disclosure, No. 153, pp. 4–5, Jan. 1977, published by Industrial Opportunities, Ltd., "TV Receiver Display of Photographs", by Cramp.

Primary Examiner—Alan Faber
Attorney, Agent, or Firm—Parkhurst, Oliff & Berridge

[57] ABSTRACT

A method of and a device for recording image signals of photographic pictures, wherein the photographic pictures on a negative film are taken by a video camera and recorded in a recording medium such as a magnetic disc. In this method of and this device for recording image signals of photographic pictures, portions of the photographic pictures recorded in frames of the negative film are taken by a plurality of enlarging magnifications as referenced from the centers of the picture surfaces and the image signals indicating these enlarged images are recorded in the magnetic disc. In consequence, when the image signals recorded in the magnetic disc are reproduced on a television screen, sharp images can be obtained.

6 Claims, 5 Drawing Sheets

FIG. 2
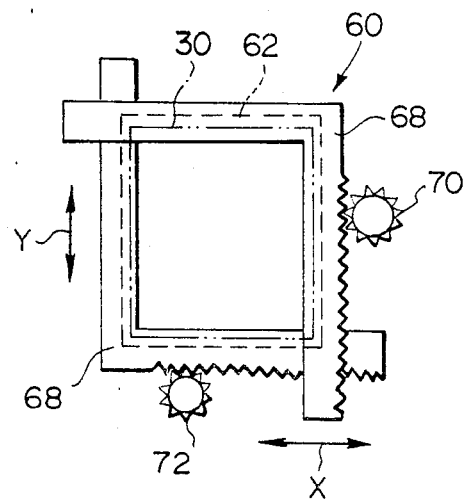
FIG. 3
(A)
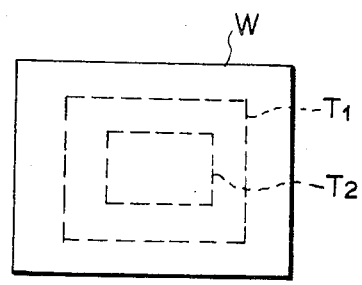
(B)
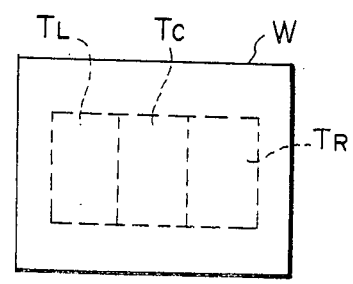

DEVICE FOR RECORDING IMAGE SIGNALS OF PHOTOGRAPHIC PICTURES

BACKGROUND OF THE INVENTION

1. Field of the Invention

This invention relates to a method of and a device for recording image signals of photographic pictures, and more particularly to a method of and a device for recording image signals of photographic pictures, wherein the photographic pictures are formed on negative film, a reversal film or the like is taken by a video camera and is recorded on a recording medium such as a magnetic disc.

2. Description of the Prior Art

Along with the spread of the video camera in recent years, there has been utilized a so-called video television album, wherein photographed subjects such as photographic negative films, prints and the like are recorded in a magnetic disc for an electronic camera, a video tape and the like for the storage reproduced by a reproducer as necessary, and images are projected on a screen of a television for entertainment. Along with this, such a service similar to the photographic print service, will shortly become available whereby photographic pictures formed on negative film and the like are image-sensed in a photographic processing laboratory (hereinafter referred to as a "labo"), recorded on a magnetic disc and the like, and the magnetic disc thus recorded is delivered to customers.

Now, in the service of the above described video television album, it becomes necessary to provide a device for recording image signals of photographic pictures in the magnetic disc from the negative film, reversal film or print. Photographic pictures which are the subject of recording in the device for recording image signals as described above, when taken by an amateur, include in general, main subjects which small in size and which are usually mixed with unnecessary portions. In this case, the photographic pictures are recorded with those unnecessary portions being excluded, and with the main subjects enlarged. When displayed on a television screen or the like, image signals which are highly appealing to the audience can be obtained.

Furthermore, when the photographic picture is a group picture, if the picture is reproduced on the television screen, then it is difficult to discriminate faces of different people. In this case, if a frame, in which the group picture is recorded, is divided into a plurality of regions, and photographic pictures of the regions thus divided are taken by a predetermined enlarging magnification and recorded, then the faces of different people can be clearly displayed on the television screen during reproduction.

Thus, when photographic pictures are recorded on a recording medium such as a magnetic disc, a trimming operation is needed.

With photographic pictures such as the negative film, methods of recording the main subject are not uniform. In trimming and enlarging the photographic picture, if the enlarging magnification could be varied continuously, it would be ideal. However, when enlarging magnifications would be set for every frame of the subject to be taken, low efficiency would result thus proving unsuitable for bulk handling in a laboratory.

On the other hand, with photographic pictures taken by amatuers, it is empirically known that main subjects are included within 80% of the frames of the photographic pictures.

Furthermore, even when the photographic pictures are group pictures, the more taking the pictures in the plurality of divided regions by the predetermined magnification is enough to meed the requirements of users.

SUMMARY OF THE INVENTION

The present invention has been developed to obviate the above-described disadvantages of the prior art and has as its object the provision of a method of and a device for recording image signals of photographic pictures, wherein portions of the photographic pictures are taken as referenced from the centers of the picture surfaces by a predetermined one or a plurality of enlarging magnifications one frame after another, and image signals indicating the enlarged pictures being automatically recorded on a recording medium.

Another object of the present invention is to provide a method of and a device for recording image signals of photographic pictures, wherein each of the frames to be taken is divided into a plurality of regions, the pictures in the regions being regularly taken by a predetermined magnification one frame after another, and image signals indicating the enlarged pictures being automatically recorded an a recording medium.

To this end, according to the present invention substantially the whole surface of a photographic picture in a frame is taken and recorded in a track of the recording medium, subsequently, portions of the aforesaid frame are taken as referenced from the center of the picture surface of the aforesaid frame by a predetermined one or a plurality of enlarging magnifications and recorded in a following recording operations described above are successively and regularly performed one frame after another of the subject.

Furthermore, according to the present invention substantially the whole surface of the photographic picture recorded in a frame of the subject is taken and recorded in a track of the recording medium. Subsequently, pictures in a plurality of divided regions in the aforesaid frame are taken by a predetermined enlarging magnification and successively recorded in the following track. Recording operations described above are regularly repeated one frame after another.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a plan view showing the negative carrier in FIG. 1;

FIGS. 3A and 3B are explanatory views for explaining the taking mode when the photographic picture recorded in the film is taken.

DETAILED DESCRIPTION OF THE INVENTION

A detailed description will hereunder be given of the preferred embodiment of a device for recording image signals of photographic pictures according to the present invention with reference to the accompanying drawings.

Figure 1:
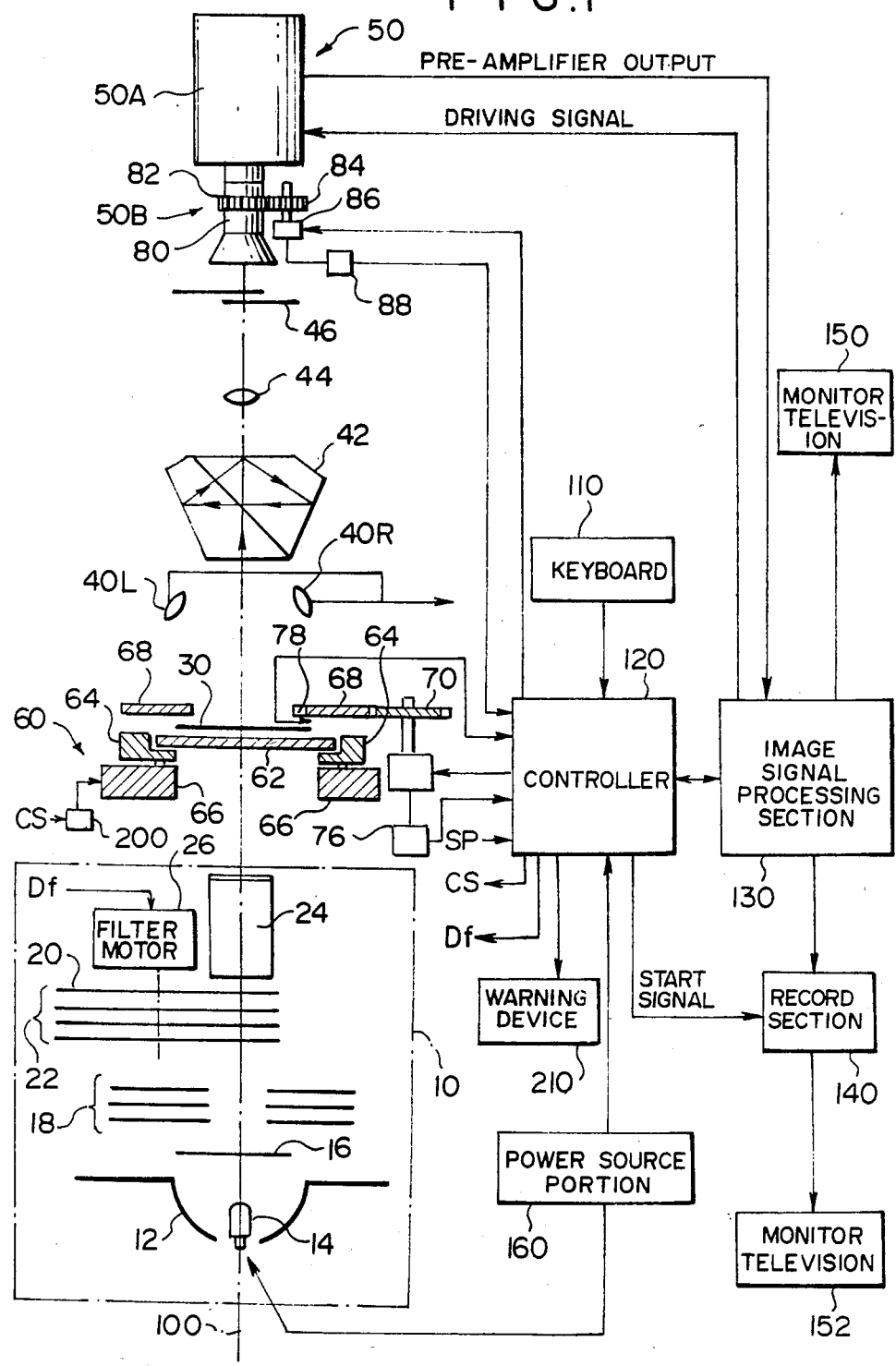
FIG. 1 is a block diagram showing an embodiment of the device for recording image signals of photographic pictures according to the present invention.

FIG. 1 shows the arrangement of one embodiment of the device for recording image signals according to the present invention, wherein an optical system comprises:

a light source section 10 provided on an optical axis 100;

a negative film 30 irradiated by light exiting from the light source;

an image-rotation prism 42 for image-rotating so that photographic pictures recorded on the negative film 30 can become normal images in image sensing section 50;

an image-focusing lens 44;

a shutter 46; and the image sensing section 50. A glass plate 62 rests on a base 66 through bedplate 64 and 64.

Furthermore, a pair of mask plates 68 and 68 of generally L-shape are provided on the negative film 30 as shown in FIG. 2, and a rack is cut on an outer side of each one side of the mask plates 68. The mask plates 68 and 68 are movable in directions indicated by arrows X and Y, respectively, in FIG. 2, by pinions 70 and 72 which are rotatably driven by driving means such as a motor in accordance with a specified enlarging magnification.

In FIG. 1, provided on a rotary shaft of a motor 74 for rotatably driving the pinion 70 is a potentiometer 76 for detecting an angle of rotation of the motor 74, i.e. movement values of the mask plates 68.

Additionally, in FIG. 1, for convenience of explanation, the pinion 72 and the potentioneter are omitted, however, in practice, these members are provided similarly to the pinion 70.

As described above, a negative carrier 60 for trimming the negative film 30 comprises the glass plate 62, the bedplates 64 and 64, the mask plates 68, the pinions 70 and 72, the motor 74 and the like. This negative carrier 60 itself is made movable by a motor 200 drivably controlled in response to a control signal CS output from a controller 120, so that the center of the picture surface of a plurality of divided regions in a frame of the negative film 30 can coincide with the optical axis 100 of the optical system.

Further, provided at one side of the negative film 30 is a film detecting element 78 for detecting a notch to sense a stop position, which is formed at an edge portion of each of the frames of the negative film 30, so that the frame feed can be stopped at a position where the center of the picture surface coincides with the optical axis of the optical system during frame feed.

As for the negative film 30 in practice, a plurality of the negative films spliced to one another are successively frame-fed, whereby the image signals are recorded in predetermined tracks on the negative disc. As a consequence, in order to allot one magnetic disc to one negative film, there is needed a signal for detecting a state where the recording of one negative film is completed. In this embodiment, means for detecting a splice to join the negative films to each other, e.g. a light emitting element and a light receiving element are provided at positions interposing the negative film 30 therebetween, so that the aforesaid state can be detected.

Further, provided upwardly of the negative film 30 and interposing therebetween the optical axis 100 are negative density detecting elements 40R and 40L each having a large dynamic range; for detecting densities (quantities of light) of components of the three primary colors of Blue(B), Green(G), and Red(R) out of the light transmitted through the negative film 30.

The light source section 10 comprises:

a halogen lamp 14 surrounded by a lamp reflector 12;

a heat insulating filter 16 for absorbing infrared rays and for transmitting only visible rays;

color temperature correcting filters (C, M and Y) 18 provided upwardly of the heat insulating filter 16, for correcting color temperature of the light source;

a group of filters including a ND filter 20 provided further upwardly of the color temperature correcting filters 18, for correcting the negative film, which is driven on an axis parallel to the optical axis 100 by a filter motor 16, and color correcting filters (C, M and Y) 22; and a diffusion box 24 provided upwardly of the group of filters.

The ND filter 20 is one being variable in optical density according to the angle of rotation. Variation of the angle of rotation can vary the quantity of light transmitted therethrough in a logarithmic curve mode. Further, the color correcting filters 22 include three filters of C, M and Y, in which optical densities of color components are continuously varied according to the angles of rotation, respectively.

Detection outputs of the negative density detecting elements 40R and 40L are taken into a controller to be described hereunder and used for drivably controlling the filters 20 and 22. The shutter 46 protects the image sensing section 50.

The image sensing section 50 comprises a television camera body 50A and a zoom lens 50B. The television camera body 50A includes; a color separating prism for separating light transmitted through the negative film 30 from the halogen lamp 14, by way of the filters 18, 20, 22 and the like and caught by the image focusing lens 44, into the three primary colors of B, G and R; three image pickup tubes for image-sensing the B, G and R, light which have been separated; and three preamplifiers for amplifying outputs from these image pickup tubes.

Furthermore, mounted to a tube 80 of the zoom mechanism 50B is a ring gear 82, which is adapted to be in mesh with a gear 84 rotatably driven by a motor 86. The tube 80 is moved by the rotation of the ring gear 82, whereby the photographic picture recorded on the negative film 30 is enlarged by a predetermined enlarging magnification.

Further, provided on a rotary shaft of the motor 86 is a potentiometer 88 for detecting an angle of rotation of the motor 86, i.e. a movement value of the tube 80 of the zoom lens 50B.

The device for recording image signals of photographic pictures according to the present invention comprises:

the above-described optical system;

a keyboard 110 for inputting taking mode specifying data to take the photographic picture recorded in the negative film 30 in a predetermined taking mode, data to correct optical densities and colors of the negative film 30, data to set various conditions, and the like;

a controller 120 for taking in detection outputs from the keyboard 110, the negative density detecting elements 40R and 40L, the potentiometers 76 and 88, the splice detecting means and the film detecting element 78, and performing drivable control of the mask plates 68 in the negative carrier 60, drivable control of the negative carrier 60 itself, drivable control of the tube 80 in the zoom lens 50B, drivable control of the filters 20 and 22, and the like in response to the above-mentioned detection outputs;

an image signal processing section 130 for color-correcting image signals (color-separated signals) obtained from the image sensing section 50 under control of the controller 120 and composing the same to form image signals;

a record section 140 for receiving image signals outputted from the image signal processing section 130 and recording the same in predetermined tracks of a magnetic disc through a magnetic head;

a power source section 160 for supplying power sources to monitor televisions 150 and 152, the halogen lamp 14 and the respective sections; and a warning device 210 for issuing warnings by use of a buzzer or flickering of an indication element such as a lamp, when the frame-feed of the negative film 30 is not normally performed, or when the recording in the magnetic disc is not normally performed.

The taking modes specifiable by the keyboard 110 in this embodiment are of three types including a normal mode, an enlarging mode and a scan mode.

Here, the normal mode is one wherein substantially the whole surface of a frame of the negative film 30 is taken one frame after another and recorded in the tracks of the magnetic disc. Furthermore, as shown in FIG. 3 (A), the enlarging mode is one wherein substantially the whole surface (W) of a frame of the negative film 30 is taken and recorded in a predetermined track of the magnetic disc, thereafter, the aforesaid frame is taken as referenced from the center 0 of the picture surface of the aforesaid frame by a plurality of enlarging magnifications ($T_1$ and $T_2$) and recorded into a plurality of tracks (e.g. two tracks) adjacent the aforesaid track and this operation is repeated one frame after another.

Furthermore, as shown in FIG. 3(B), the scan mode is one wherein substantially the whole surface (W) if a frame of the negative film 30 is taken and recorded in a predetermined track of the magnetic disc, thereafter, photgraphic pictures in a plurality of divided regions ($T_L$, $T_C$ and $T_R$) of the frame are recorded in tracks adjacent the aforesaid track, and this operation is repeated one frame after another.

Additionally, a driving amplifier for driving the shutter 46, a prism motor for rotating an image-rotating prism 42 through a predetermined angle and the like are needed in practice, but has no direct relation to the gist of the present invention, and hence, are omitted in description.

The controller 120 comprises a CPU for performing various calculations on the basis of a ROM having stored therein fixed data necessary for trimming and showing a plurality of present enlarging magnifications, fixed data such as a reference value showing a proper exposure of negative film and RAM wherein, temporarily, data are written in or read out therefrom, and a program stored in the ROM, and I/O interface and the like.

Furthermore, the image signal processing section 130 comprises a $\gamma$ correction circuit for performing color correction of outputs of the pre-amplifier having color components of B, G and R which have been obtained by amplifying the image signals of the three image pickup tubes in the image sensing section 50, a color encoder section for composing the image signals of B, G and R, which have been color-corrected by the $\gamma$ correction circuit to form a composite image signal, and the like.

Additionally, the monitor television 150, when an image signal indicating a photographic picture recorded in the negative film is recorded in the magnetic disc, displays the photographic picture. The monitor television 152, when the magnetic disc having therein recorded the image signal indicating the photographic picture of the negative film is reproduced by a reproduction portion provided in the record section 140, is to check the photographic picture.

Figure 4:
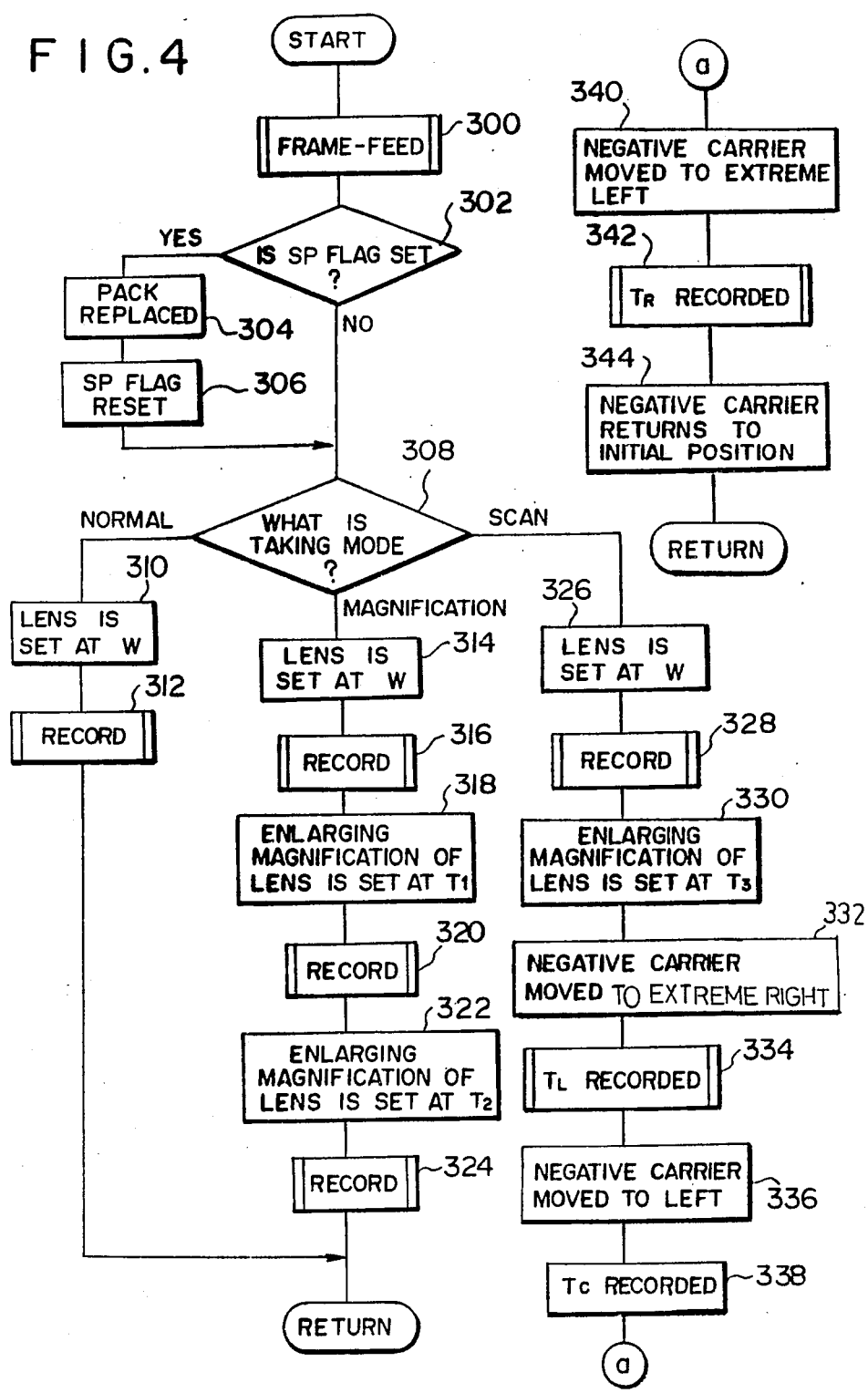
FIGS. 4 to 6 show the contents of the program carried out by a central processing unit (CPU) in a controller 120 shown in FIG. 1, FIG. 4 being a flow chart showing the contents of a main routine, FIG. 5 a flow chart showing the contents of frame feed processing routine, and FIG. 6 a flow chart showing the contents of the record processing routine.

Description will now be given of action of the device for recording image signals, having the above-described arrangement with reference to flow chart shown in FIGS. 4 to 6. FIG. 4 shows the contents of a main routine of a program to be performed by the CPU in the controller 120. Referring to FIG. 4, when the program is started, the frame feed process is performed in Step 300. This frame feed process has such contents that one frame of the negative film is transferred as referenced from the optical axis 100 of the optical system by film transfer means upon completion of the taking and recording operations for one frame of the negative film, which is performed by the frame feed process routine shown in FIG. 5 to be described below.

Further, in Step 302, judgment is made as to whether a splice detection flag is set or not, i.e. whether the operation of transferring one negative film is completed or not. Here, the splice detection flag is the flag set in a flag register of the I/O interface in the controller 120 when a joint where an end of one negative film is joined to an end of another negative film is detected by the splice detecting means (a splice detection signal SP), i.e. the flag for identifying whether the operation of transferring one negative film, i.e. the operations of taking and recording are completed or not.

When it is judged that the splice detection flag is set in Step 302, the magnetic disc pack is replaced by a new one in Step 304, subsequently, the splice detection flag is reset in Setp 306, and the process proceeds to Step 308.

Furthermore, when it is judged that the splice detection flag is reset in Step 302, the process proceeds directly to Step 308, and judgment is made as to what the taking mode specified by the keyboard 110 is, in Step 308.

When it is judged that the taking mode specified in Step 308 is the normal mode, the process proceeds to Step 110, where the zoom lens 50B is set at a wide angle W so that substantially the whole surface of a frame of the negative film 30 can be taken.

More specifically, the tube 80 of the zoom lens 50B is moved vertically in FIG. 1 by the motor 86 driven in response to a control signal from the controller 120 so as to be set at an enlarging magnification of the wide angle W.

Further, record processing is performed in Step 312. This record processing includes the operation of recording of image signals into the magnetic disc and the inspection of the recorded state, and is performed in accordance with a record processing routine to be described hereunder. Upon completion of record processing in Step 312, the execution of this main routine is ended.

On the other hand, when it is judged that the taking mode specified in Step 308 is the enlarging mode, the zoom lens 50B is adjusted to be set at the wide angle W by the rotatable driving of the motor 86, so that substantially the whole surface of a frame of the negative film 30 can be taken in Step 314. Subsequently, in the following Step 316, the same record processing as in the Step 312 is performed. This record processing is similarly performed in Steps 320, 324, 328, 334, 338 and 342 as well.

Now, after the record processing is performed in Step 316, the engalrging magnification of the zoom lens 50B is set at $T_1 (<T_2)$ in Step 318. Along with this change in the enlarging magnification of the zoom lens, the mask plates 68 and 68 are moved by the rotatable driving of the motor 74 or the like through the pinions 70 and 72, the opening area formed by the mask plates 68 and 68 is adjusted so that the screen having an area commensurate to the enlarging magnification, and the taking area of a frame of the negative film is specified. Further, the controller 120 outputs to the filter motor a control signal Df to drive the ND filter 20 so that an incident light quantity to the image sensing section can be constant in response to a detection output showing the densities of the negative film from the negative density detection elements 40R and 40L, whereby the incident light quantity is adjusted. The reason for this adjustment is that, since the quantity of light transmitted through the negative film 30 is decreased due to the trimming operation, it is necessary to make such an adjustment that a constant quantity of light showing a proper exposure can be obtained by the ND filter 20.

The drivable control of the mask plates 68, 68 and the drivable control of the ND filter are performed each time the enlarging magnification of the zoom lens 50B is varied. Hereinafter, description thereof will not be repeated.

In Step 320, an enlarged image is taken at the enlarging magnification $T_1$ as referenced from the center of the picture surface of the photographic picture of the same frame as recorded in Step 316, and image signals showing the enlarged image are recorded in a track adjacent the aforesaid track.

Similarly, in Step 322, the enlarging magnification of the zoom lens 50B is further set at $T_2$, and, in Step 324, image signals indicating the enlarged images taken at the enlarging magnification $T_2$ are recorded in a track adjacent the track recorded in the Step 320, thus completing this main routine.

When it is judged that the taking mode specified in the Step 308 is the "scan mode", the process proceeds to Step 326, where the zoom lens 50B is set at the wide angle W so that substantially the whole surface of a frame of the negative film 30 can be taken, and subsequently, the record processing is performed in Step 328.

Further, in Step 330, the enlarging magnification of the zoom lens 50B is set at $T_3$, in Step 332, the opening area formed by the mask plates 68 and 68 is adjusted so that a picture surface having an area commensurate to the enlarging magnification can be obtained in a frame of the negative film 30, and the negative carrier 60 is moved by the motor 200 to the extreme right in FIG. 1 till the center of the picture surface in the area $T_L$ of a frame of the negative film 30 coincides with the optical axis. In Step 334, an enlarged image of the region $T_L$ of a frame of the negative film 30 (Refer to FIG. 3 (B)) is taken and recorded. Then, in Step 336, the negative carrier 60 is moved to the left in FIG. 1 until the center of the picture surface in the region $T_C$ of the same frame as aforesaid of the negative film 30 coincides with the optical axis 100.

Further, in Step 338, an enlarged image of the region $T_C$ of the negative film 30 (Refer to FIG. 3 (B)) is taken and recorded, and subsequently, in Step 340, the negative carrier 60 is moved further to the extreme left by the motor 200. Then, in the following Step 342, an enlarged image of the Region $T_R$ of a frame of the negative film 30 (Refer to FIG. 3 (B)) is taken and recorded, and the negative carrier 60 is moved to the right in FIG. 1 so as to return to the initial position in Step 344, thus completing this main routine.

Figure 5:
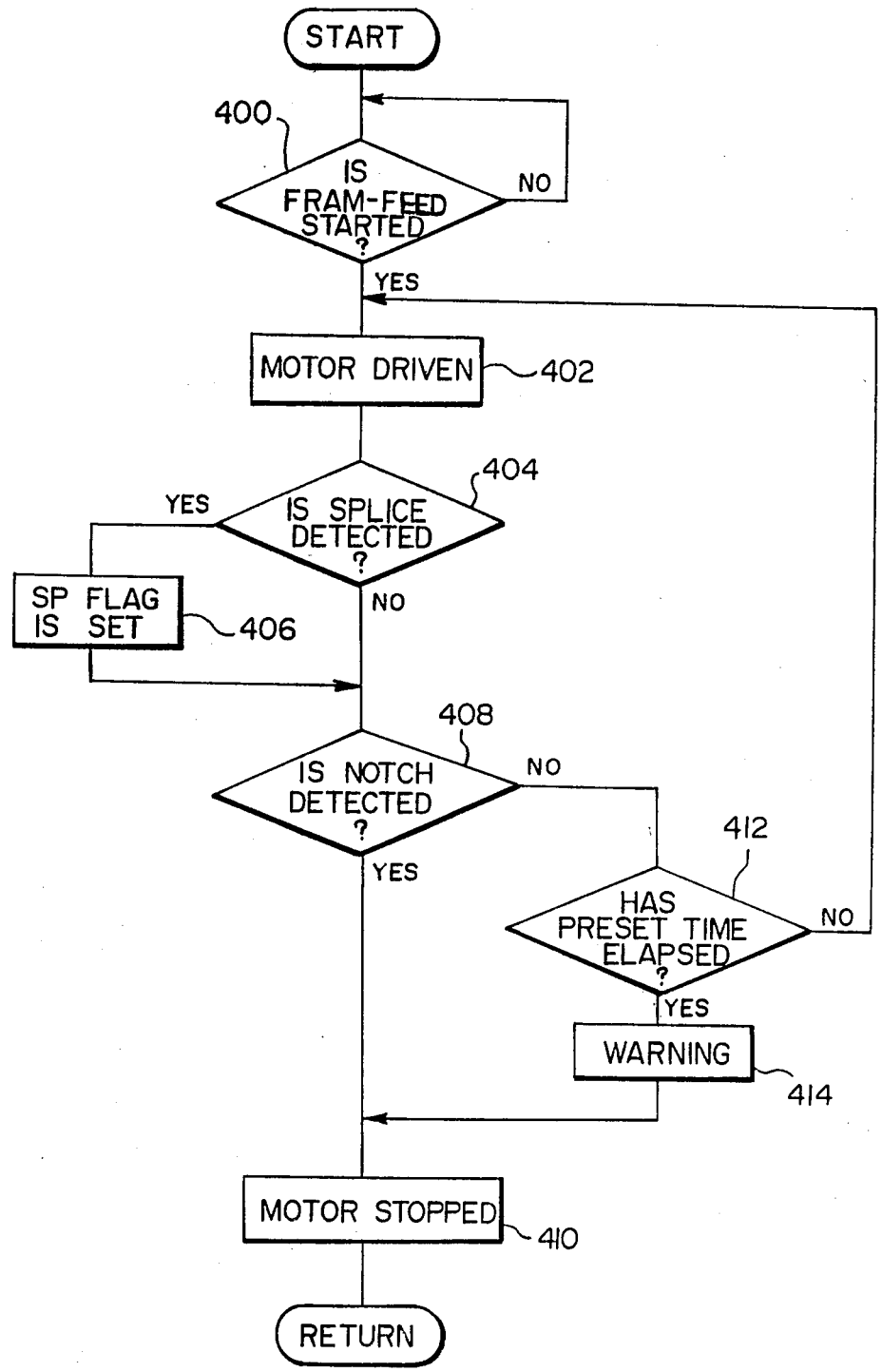

Subsequently, FIG. 5 shows the contents of a routine of frame feed processing. Referring to FIG. 5, in Step 400, it is judged as to whether a command to start the film transferring means including the driving device such as the motor is inputted from the keyboard 110 or not. When it is judged to be NO, the same judgment is repeated. When it is judged to be YES, in the following Step 402, the motor of the film transferring means is driven, and the process proceeds to Step 404, where it is judged as to whether a splice is detected by the splice detecting means, not shown, or not. When a splice is detected, a splice detection flag is set at the flag register of the I/O interface in Step 406, and the process proceeds to Step 408. When no splice is detected in the Step 404, the process proceeds to the Step 408 as it is. In the Step 408, judgment is made as to whether a notch formed at an edge portion of the negative film 30 is detected or not by the film detecting element 78, i.e. whether the center of the picture surface of a specified frame of the negative film 30 is frame-fed to a position where the center coincides with the optical axis 100 by the film transferring means or not. When the notch is detected in the Step 408, rotation of the motor which is the driving source of the film transferring means is stopped in Step 410, thus completing this processing routine.

When it is judged that no notch is detected in Step 408, the process proceeds to Step 412, where it is judged as to whether a predetermined time duration (e.g. 2 sec) has lapsed after the instigation of the rotation of the driving the motor. When it is judged that the predetermined time duration has not lapsed in the Step 412, the process returns to the Step 402, and the same processing as aforesaid is performed.

Furthermore, when it is judged that the predetermined time duration has lapsed in the Step 412, the controller 120 outputs a control signal to the warning device 210 to issue a warning by use of the buzzer, lamp and the like, in Step 414, and subsequently, in Step 410, the motor is stopped in rotation, thus completing this processing routine.

Figure 6:
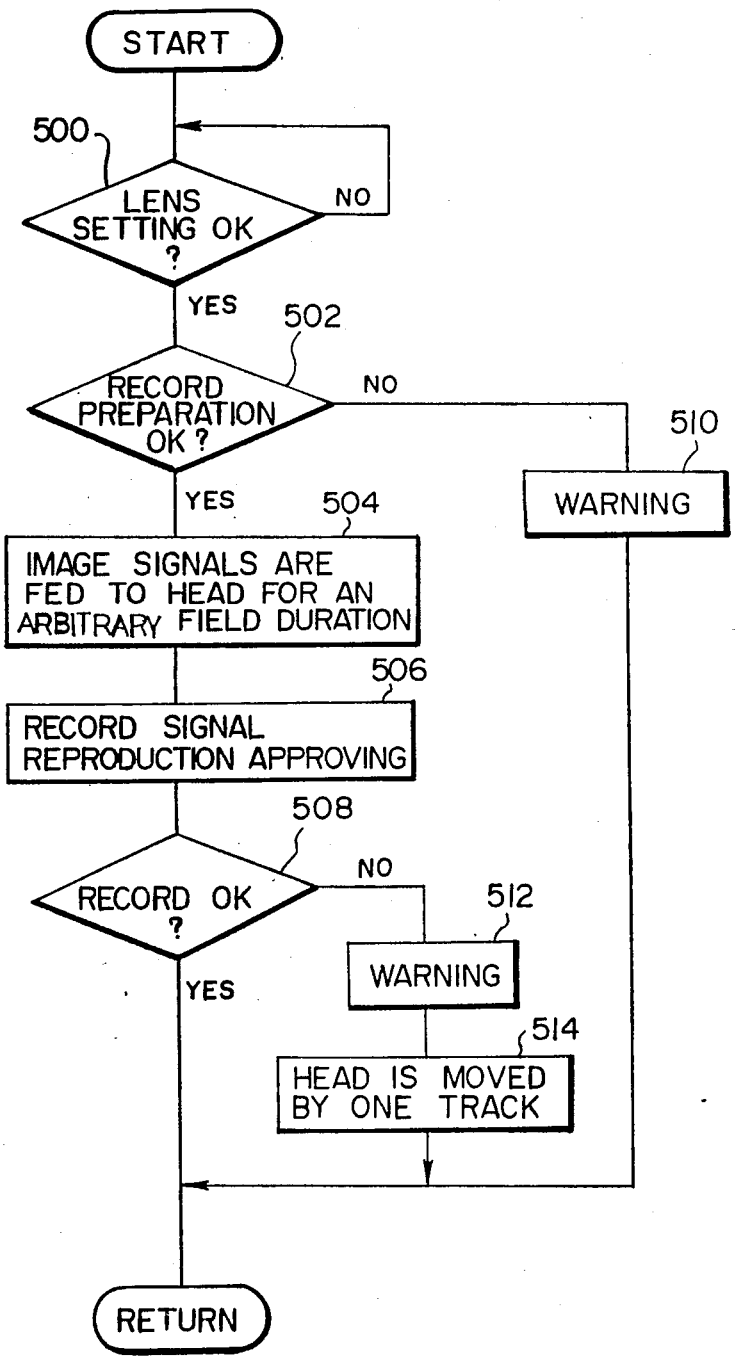

Subsequently, FIG. 6 shows the contents of the record processing routine. Referring to FIG. 6, in Step 500, it is judged as to whether setting of the zoom lens 50B is completed or not. When it is judged to be NO, the same judgment is repeated. When it judged to be YES, it is judged as to whether the preparation for recording is completed or not in Step 502. When it is judged to be NO in the step 502, a warning is issued by the warning device 210 in Step 510, thus completing this processing routine.

On the other hand, when it is judged that the preparation for recording is completed in the Step 502, in the following Step 504, image signals are supplied to the magnetic head in the record section 140 for a time duration of an arbitrary field and recorded in a predetermined track of the magnetic disc. Further, in Step 506, the image signals recorded in the magnetic disc are reproduced by the reproduction portion provided in the record section 140 and checked for approval. Then, in Step 508, it is judged as to whether the recorded state in the magnetic disc is satisfactory or not.

When it is judged to be NO in the Step 508, a warning is issued by the earning device 210 in Step 512, and subsequently, in Step 514, the magnetic head is moved by one track of the magnetic disc, thus completing this processing routine.

Furthermore, when it is judged that the recorded state in the magnetic disc is satisfactory in the Step 508, this processing routine is completed as it is.

As has been described hereinabove, in this embodiment, consideration is given to the fact that, with the photographic pictures taken by the amateurs, the main subjects are substantially at the center of the picture surface of the frames of the subject such as the negative film and the main subjects are included within 80% of the frames of the photographic pictures, whereby the same frame is continuously taken at a plurality of enlarging magnifications with the optical axis being previously set at the center, successively recorded in tracks adjacent to one another of the magnetic disc, and this operation is regularly repeated one frame after another, so that enlarged images trimmed in the states of incorporating the main subjects can be automatically recorded in the recording meduim such as the magnetic disc.

Furthermore, in this embodiment, when the photographic picture recorded in a frame of the negative film is a group picture, the frame is divided into a plurality of regions, image signals of the frame thus divided are taken at a predetermined enlarging magnification and successively recorded, and this recording operation is regularly repeated one frame after another, so that the image signals, which are partially enlarged from the group picture, can be automatically recorded in the recording medium such as the magnetic disc.

In this embodiment, one portion of the photographic picture recorded in a frame of the subject is enlarged and recorded in the recording medium, so that a photographic picture giving an impression completely different from that of the original photographic picture can be obtained.

Furthermore, the subject to be taken in this embodiment is a silver salt photographic pictures having a high information density, the zooming or trimming does not lead to deteriorated picture quality.

Additionally, in this embodiment, description has been given through an example of the negative film as being the subject to be taken, however, the present invention need not necessarily be limited to this, and is applicable to a reversal film as well.

Furthermore, in this embodiment, the zoom lens has been used as the optical system for enlarging the photographic picture recorded in the subject to be taken at a predetermined enlarging magnification, however, the present invention need not necessarily be limited to this, and such an arrangement may be adopted that, for example, a plurality of lens system different in enlarging magnification from one another are mounted on a turret, and each of the lens systems is successively rotatably moved to the optical axis, so that a plurality of enlarging magnifications can be set.

According to the present invention, a portion or portions of the photographic picture recorded in a frame of the subject are taken at one or plurality of enlarging magnifications one frame after another, image signals indicating the photographic picture being automatically recorded in the recording medium.

Further, according to the present invention, the photographic picture recorded in a frame is divided into a plurality of regions, and image signals indicating the enlarged image magnification from the respective regions of the aforesaid frame thus divided, can be automatically recorded in the recording medium.

It should be understood, however, that there is no intention to limit the intention to the specific forms disclosed, but on the contrary, the invention is to cover all modifications, alternate constructions and equivalents falling within the spirit and scope of the invention as expressed in the appended claims.

What is claimed is:

1. A device for recording image signals of photgraphic pictures in frames comprising:
   means for producing image signals of photographic pictures in frames at a plurality of optical enlarging magnifications;
   selection means for selecting one of said plurality of optical enlarging magnifications;
   recording means for storing said image signals;
   light quantity adjusting means for adjusting a light quantity incident upon said means for producing;
   specifying means for specifying regions of a frame of a photograph to be recorded referenced from a center of said frame; and
   control means for controlling said means for producing, said selecting means, said specifying means and said light quantity adjusting means, including:
   means for controlling said means for producing to produce an image signal of substantially a whole surface of a photographic picture in a frame;
   means for recording said image signal on a first track of said recording means;
   means for controlling said selecting means to change said optical enlarging magnification;
   means for controlling said specifying means to specify a recording region of said frame referenced to a center of said frame according to said changed optical enlarging magnification;
   means for controlling said light quantity adjusting means according to said changed optical enlarging magnification;
   means for controlling said means for producing to produce an enlarged image signal of said specified recording region at said center of said frame; and
   means for recording said enlarged image signal in a second track of said recording means, adjacent to said first track.

2. A device for recording image signals as recited in claim 1 wherein said image signal producing means is a video camera.

3. A device for recording image signals as recited in claim 2 wherein said light quantity adjusting means in a ND filter.

4. A device for recording image signals of photographic pictures in frames, comprising:
   means for producing image signals of photographic pictures in frames at a plurality of predetermined optical enlarging magnification said means for producing having an optical axis;
selecting means for selecting one of said predetermined optical enlarging magnifications;
recording means for recording said image signals;
light quantity adjusting means for adjusting a quantity of light incident upon said means for producing;
specifying means for specifying a plurality of adjacent recording regions of the photographic picture in said frame;
frame moving means for moving said frame align a center of a respective specified recording region of said frame with the optical axis of said means for producing; and
control means for controlling said means for producing, said selecting means, said specifying means, said frame moving means and said light quantity adjusting means, including:
means for controlling said means for producing to produce an image signal of substantially a whole surface of a photographic picture in a frame;
means for recording said image signal in a first track of said recording means;
means for controlling said selecting means to select one of said predetermined optical enlarging magnifications;
means for controlling said light quantity adjusting means according to said selected optical enlarging magnification;
means for controlling said specifying means to specify a plurality of adjacent regions of said frame;
means for controlling said frame moving means and said producing means to produce a plurality of enlarged image signals corresponding to each of said plurality of adjacent specified regions of said frame;
and means for recording said plurality of enlarged image signals in a second track of said recording medium, adjacent to said first track.

5. A device for recording image signals as recited in claim 4 wherein said means for producing image signals is a video camera.

6. A device for recording image signals as recited in claim 5 wherein said light quantity adjusting means is a ND filter.

* * * * *